United States Patent [19]

Shorey

[11] Patent Number: 4,992,283
[45] Date of Patent: Feb. 12, 1991

[54] FROZEN CONFECTION HOLDER FOR TODDLERS

[76] Inventor: Marian Shorey, 93 Cleveland Ave. #33, Adams, Mass. 01257

[21] Appl. No.: 453,677

[22] Filed: Dec. 20, 1989

[51] Int. Cl.⁵ .............................................. A23G 9/26
[52] U.S. Cl. .................................... 426/132; 426/75; 426/104; 426/90; 426/95; 426/139; 426/801; D1/102
[58] Field of Search ................. 426/132, 134, 138, 91, 426/421, 110, 101, 90, 75, 104, 95, 139, 801; D1/101-105; 606/234-236

[56] References Cited

U.S. PATENT DOCUMENTS

| | | | |
|---|---|---|---|
| D. 192,225 | 2/1962 | Coleman | D44/1 |
| D. 274,859 | 7/1984 | Harris et al. | 426/134 |
| D. 291,620 | 9/1987 | Porchia | D1/105 |
| 1,593,858 | 7/1926 | Venable | 426/134 |
| 1,623,926 | 4/1927 | Kohler | 426/134 |
| 1,652,789 | 12/1927 | Moore | 426/134 |
| 1,835,719 | 12/1931 | Parr | 426/134 |
| 1,867,945 | 7/1932 | Hunter | 426/134 |
| 1,942,896 | 1/1934 | Jones | 426/139 |
| 1,947,872 | 2/1934 | Nolte | 426/110 |
| 2,001,919 | 5/1935 | Nolte | 426/134 |
| 2,190,231 | 2/1940 | Craddock | 426/132 |
| 2,317,067 | 4/1943 | Knaust | 426/110 |
| 2,321,519 | 6/1943 | Rubinoff | 426/134 |
| 2,632,708 | 3/1953 | Sueskind | 426/134 |
| 2,735,778 | 2/1956 | Taylor | 426/134 |
| 2,766,123 | 10/1956 | Moubayed | 426/134 |
| 2,803,550 | 8/1957 | Ackalusky | 426/134 |
| 2,948,452 | 8/1960 | Grogan | 229/1.5 |
| 2,980,039 | 4/1961 | Jolly | 426/134 |
| 3,459,296 | 8/1969 | Berg | 426/134 |
| 3,782,194 | 1/1974 | Brodie et al. | 374/151 |
| 4,239,175 | 12/1980 | Straubinger | 249/92 |
| 4,381,785 | 5/1983 | Robbins | 128/359 |
| 4,720,037 | 1/1988 | Alpert | 426/101 |

FOREIGN PATENT DOCUMENTS

| | | | |
|---|---|---|---|
| 49730 | 12/1934 | Denmark | 426/139 |
| 3617093 | 10/1986 | Fed. Rep. of Germany | 426/134 |
| 1120990 | 3/1955 | France | 426/132 |

Primary Examiner—Steven Weinstein
Attorney, Agent, or Firm—Schmeiser, Morelle & Watts

[57] ABSTRACT

A device for mounting thereon a consumable confection. The invention is a combination of a mouth and lip conforming confection that is mounted on a drip-catching, stylistically shaped, biodegradable handle that can be grasped comfortably and securely by a toddler. The drip catch device may be either of a consumable composition and secured to the handle by a nontoxic, consumable musilage, or it may be formed integrally with the handle and be of a nontoxic, disposable, biodegradable composition. The main objective of the invention is to provide a confection holder, whether for frozen product or other solid or semi-solid product, that may be securely grasped by a toddler and which has the shape most comfortably and easily received into the toddler's mouth. The base handle is biodegradable and is disposable; it provides an aseptic means for the toddler to handle the confection during its consumption.

4 Claims, 1 Drawing Sheet

FROZEN CONFECTION HOLDER FOR TODDLERS

BACKGROUND OF THE INVENTION

1. Field of the Invention

This invention relates to an improved sanitary holder for frozen confections and, in particular, such holders as incorporate sanitary drip catches or collars and which are inherently biodegradable.

2. Discussion of the Relevant Art

For some time I have purchased for my smaller children ice cream cones, ice-on-a-stick and similar confections. I have never been fully pleased with the devices, whether or not consumable, that are generally used to hold, contain or mount these frozen desserts. For example, the common ice cream cone (a waffle or sugar/honey pastry formed in a conical shape) is generally fitting for an adult; but in the case of a smaller child, the cone (although consumable and therefore not a trash or environmental bother) is less than fully satisfactory to the concerned parent. Firstly, a small child or toddler is often given such a confection (the shopping trip "treat") after having placed his/her hands on everything from countertops to animals during the course of the family outing. A judicious parent might admonish the child not to eat the cone because his/her hands are soiled. But to the child, the cone is part of the treat and it is meant to be consumed. The notion of wrapping a piece of tissue about the cone as it is given to the child is as efficacious as directing the child not to touch anything "while out". Secondly, if the temperature is well above freezing, any frozen confection in the hands of a toddler is likely to become a mess quite quickly. The ordinary ice cream cone or stick mount is utterly useless under such a condition and the parent, more often than not, must help the child consume the confection, whether in the parent's diet or not. Thirdly, there exists the problem of the combination ice cream cone or dessert on-a-stick being an asymmetrically weighted contrivance. A single scoop of ice cream on the traditional waffle cone, for example, is easily managed by an adult; but the toddler or small child, having at best a tenuous grip on the cone (and even more tenuous on a stick) is always in imminent danger of loosing or spilling the ice cream/confection. Further, such small children rarely have full rotation/derotation capability in their infant wrists. The inability to obtain a sure grip on the cone or the stick only complicates the issue and makes for a more uncertain consumption experience. Finally, when the ordeal is finally concluded, most (or part of) the ice cream/confection is disposed of and the non-biodegradable holder remains to present problems for other individuals.

So much of the previous discussion was devoted to the general character of an ice cream holder; nonetheless, I feel that another area has been sorely lacking in attention since the advent of the ice cream cone and frozen product described above. In practically every instance that I have had the opportunity to review, the ice cream or frozen confection itself is of a general morphology or shape that poses persistent problems to the small child or toddler who not only lacks dexterity, but also lacks lip, mouth and jaw muscular control that would allow him/her to easily consume these confections in their spherical, rectangular or (rarely, and at best) triangular shapes. What is truly lacking, therefore, and what I satisfy by the instant invention is a shape for an ice cream or frozen confection that may be readily accommodated (and handled) by a young child or toddler. Thus, my invention addresses and solves the aforementioned problems for the entire ice cream cone/frozen confection article—from the top to the bottom tips, so to speak. And I do this by changing the top and eliminating the bottom tip.

A thorough study of the relevant art, some of which is currently available on the market, leads me to conclude that there is great utility in the invention that I currently inculcate; and any mother or father who takes a young child on an afternoon outing for an ice cream "treat" will readily verify the need for such a device. My invention comprises a special frozen confection holder for a young child in the toddler age group. The device consists in three basic parts: part one is a confection that is molded or shaped to accommodate a child's (toddler's) mouth; part two is a biodegradable handle means that is shaped to accommodate a child's (toddler's) hand, completely; and part three is an apron or drip catch formed integrally with the handle and situated between the handle proper and the confection. Also as part of the handle and drip catch, more specifically (i.e., concentrically) located and forming the base upon which the confection rests, is a special annular well or grooving which will receive a confection when it is plastic or poured on/into the base piece of the handle means. Such a device as the latter will retain the frozen product even though the child rotates/derotates the wrist in a manner that would normally spill the traditional ice cream dip. Thus, the handle and drip catch, with the confection retention well, comprises a singular unit that actually forms the pedestal to which the confection is mounted. It is my experience that this unique combination, including the special morphology of the frozen product itself, appears nowhere in the relevant art.

During my search for relevant art I happened upon five patents which were, in some aspects, germane to the instant invention. The following are illustrative of both solutions to problems and current deficiencies in this art, relative to the needs of a young child (toddler): an ICE CREAM CONE HOLDER (U.S. Design Pat. No. 291,620) issued to Porchia; A SANITARY DRIP CATCHING DEVICE (U.S. Pat. No. 2,948,452) issued to Grogan et al; a MOLD FOR FORMING FROZEN FOOD PRODUCT AND CAP MEMBER THEREFOR (U.S. Pat. No. 4,239,175) issued to Straubinger; a COMBINED HANDLE STICK AND CUP COVER FOR FROZEN CONFECTIONS OR THE LIKE (U.S. Design Pat. No. 192,225); issued to Coleman, and a BABY PACIFIER (U.S. Pat. No. 4,381,785) issued to Robbins. Porchia teaches, by design, what he describes as an ice cream cone holder. This device appears to be a low cup having a conventional pedestal base and a cylindrical hole therethrough. Since the inventor terms this an ice cream cone holder, it must be presumed that a conventional ice cream cone is to fit down through the cylindrical conduit located in the cup center. If a child were to hold this d(R)vice in its hand, it would be necessary for him/her to wedge the short pedestal throat between the third and fourth fingers of its hand. Assuming, for the moment (but not taught by the inventor), that an ice cream dip or frozen confection were to be placed onto the holder, it may be said, in some respects, to resemble the instant invention's drip catch apron with a possible hint of the pedestal well that would be used to secure the confection. However, this latter supposition is clearly not taught nor borne out by the disclosure of Porchia.

Grogan, on the other hand, teaches a sanitary drip catching device which is, in fact, an ice cream cone holder. It is formed of a molded plastic, frusto-conical, open-ended device fitting the cone proper and has a surrounding drip catching tray or apron thereon, adjacent the wider end thereof. Thus, Grogan teaches a truncated right cone into which the ice cream cone is inserted and which bears an annular apron which would be spread out somewhat underneath the ice cream dip or spheroid. Two significant disadvantages are seen here in that (1) being of a plastic material, the device is most likely nonbiodegradable; and (2) since the device is a truncated right cone, it only follows (and is illustrated by the inventor) that the bottom portion of the cone would protrude beyond the sanitary drip catching device of the invention. Thus, it appears to me that the very sanitary purpose of the device would be frustrated in the case of a toddler who could only grip the cone near its descending apex (tip). Thus, save for the drip catching apron, an unclean cone would remain to be consumed and disposal of the remaining holder would present the same environmental disposal problem as the Porchia ice cream cone holder or the multitude of stick devices that are currently on the market.

The Straubinger patent is cited here for relevance in the fact that it is a mold invention that is used to prepare home-made frozen confections. Its relevancy, in this instance, is that the shape of the molds are the most accommodating to the small person's mouth that I have been able to find. Also, the mold cap is a semi-hemispherical device which may serve as a drip tray during consumption of the product. Again, as in the previous two patents, the confection holder (here an ordinary stick or plastic slat) may, perhaps, be biodegradable; but the problem presented to the average toddler vis-a-vis the wrist rotation/derotation problem still remains. In similar vein, the design patent issued to Coleman provides a stick and cup cover for frozen confections and which, because of its design patent type of disclosure, says no more. I presume that it is to be used for inserting into cup molds that are used for making home-made frozen confections. As previously mentioned in the case of Straubinger, I feel that this patent is relevant in that it shows and attempts to at least make a smaller confection, even though still resorting to the nondisposable stick and questionably useful drip catch (because of its planar form).

Finally, the patent issued to Robbins, although for an entirely different art form, was chosen because it is essentially the type of morphology that I originally anticipated for use in the instant invention, i.e., more mouth conforming (in this case for an infant) than the large spherical globule termed an ice cream scoop or dip. The mouth piece portion of the Robbins Baby Pacifier will readily fit, in its entirety, into an infant's mouth. Such a shape for an ice cream or frozen confection is totally unsuitable; however, the mouth piece along with other incidents such as the shield to prevent swallowing (analogous to a drip tray) and the small loop handle that can be grasped by a infant (analogous to my specially formed handle for a toddler) are, though irrelevant, nonetheless interesting.

It appears that many inventors have attempted to solve for everyone too specific a problem and have not, to this date, concentrated on satisfying just the needs of a particular demographic group. As the following disclosure will aptly point out, I have undertaken such a quest and feel that my invention will provide a much needed relief to parents and babysitters of toddleers, while providing continued satisfaction to the ultimate consumer.

SUMMARY OF THE INVENTION

The aforementioned objectives are realized and the disadvantages in the extant art are overcome by the practice of the instant invention. The invention is a special frozen confection holding device that is biodegradable and is used as the mounting platform for such confections. The platform proper is an annular collar that has centrally located therein an annular grooving (or well) that will accept the pouring or injection of the confection therein while still in a liquid or plastic state. Additional to the platform is the arcuate or upturned periphery which serves as a catchment for the confection exudate as it begins to melt. There depends from the base of the platform a relatively narrow neck that expands somewhat to a generally skirt-type shape with a flat bottom lip that can be readily grasped by a child in the 2–5 year old age group (a toddler). In its pristine form (molded, cast or otherwise shaped), the frozen confection is of an elongate nipple shape, that is, compared to an ordinary ice cream cone or frozen "pop", it is diminutive in shape so as to allow a toddler's mouth to encompass a goodly portion of the confection. By diminutive in size, I mean that it is clearly much smaller than the handle means and is of a portion that is more appropriate for a child of tender years, than a teenager or an adult.

Relative to the composition of the holder itself, I prefer a biodegradable device having the aforementioned morphology and a composition that will readily dissolve or break down when turned into the earth or, upon incineration, would be completely consumed and give off no toxic or noxious fumes. To this end, I suggest a porous paper, perhaps a recycled type, that is infused with food grade starch or flour such as corn starch, rice flour, or the like. Current state of the art would allow a "hybrid" type of holder that would have an edible portion and a nontoxic, nonconsumable and biodegradable portion. To this end I would suggest a collar composed of the sugar cone or waffle cake that is, after baking, pressed to a moistened handle of the composition previously mentioned and which, if even consumed, would present no hazard to the normal healthy child. In this manner, the drip-laden catchment (collar) could also be consumed and; when the "nub" of the handle proper is reached, it could be readily disposed of and have no adverse impact on either the trash disposal or environmental processes

DETAILED DESCRIPTION OF THE PREFERRED EMBODIMENT

Figure 1:
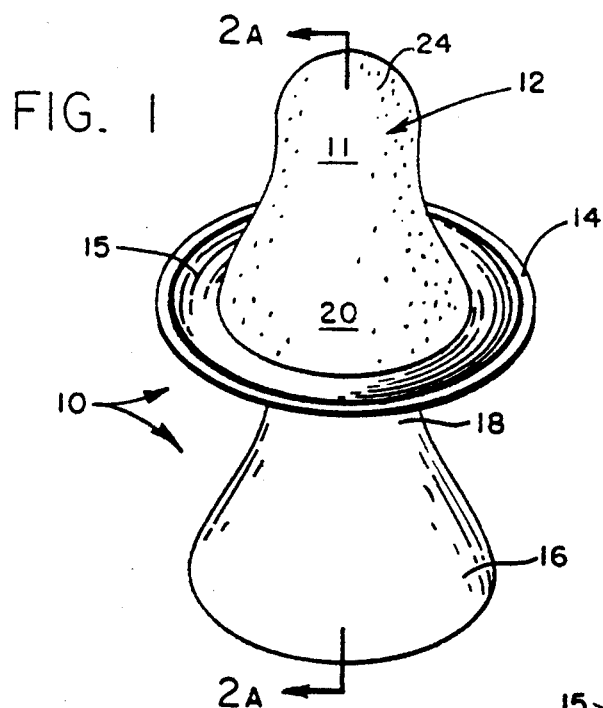
FIG. 1 is an isometric illustration of the invention.

Reference now being had to the drawings, particularly FIG. 1, there is illustrated the preferred embodiment 10 of the instant invention. The confection holding portion comprises a collar or drip catch 14 that is either contiguous to or integral with the handle 16, proper, which is alternately termed the skirt. Demarcating the drip catch 14 from the handle 16 is the neck 18 of the invention. It is important to note at this time that the handle 16 should be wide enough in its flaring so as to allow the major portion of a toddler's palm and lower three fingers to comfortably rest about its periphery (although not totally girdling the skirt portion), while his/her index finger and thumb properly encircle (or nearly completely girdle) the neck 18. In this manner, the youngster will maintain a sure grip on the entire apparatus and the drip catch 14 will rest on the thumb and index finger in coplanar registry therewith. Within the annular upraised drip catch 14 the reader may clearly discern the platform 15 portion of the invention. The frozen confection or ice cream 12 is seen disposed atop the platform 15 portion of the drip catch 14. Most noticable in the confection 12 is the generally nipple-like shape of the entire object. Later, in the discussion of FIG. 2A, the prior art which stimulated me to devise the instant invention will be discussed briefly. Concluding FIG. 1, the confection 12 is defined by the broadened base area 20 which narrows down to the nippled end 24. The dimensions of the device should be readily apparent to those of ordinary skill in that it is the purpose of the confection 12 morphology to provide a structure that may be easily taken into the foremouth of a toddler but generally restrict ingestion to the first few centimeters. Also, for the purposes of brevity, the drip catch 14 has not been distinguished from the handle portion 16, 18. As alluded to earlier, it is not necessary that the drip catch be composed of the same substance as the biodegradable handle. Further reference to the remaining drawings shall amply point out these factors.

Figure 2C:
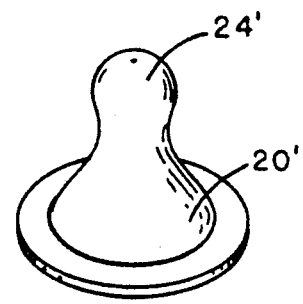
FIG. 2C is an isometric illustration of prior nipple art.
Figure 2A:
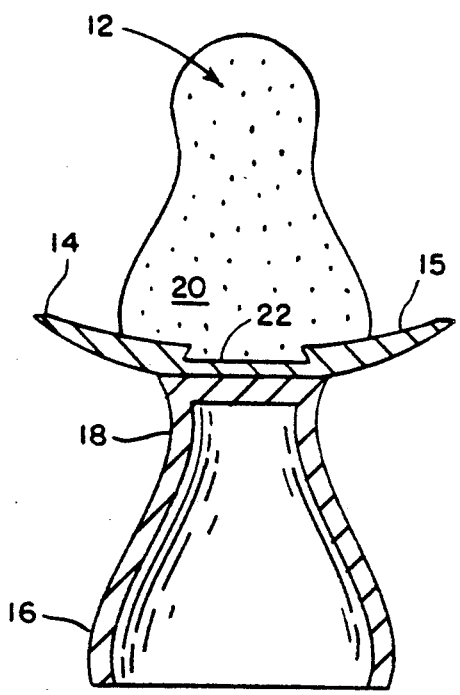
FIG. 2A is a sectional side elevation of the invention.
Figure 2B:
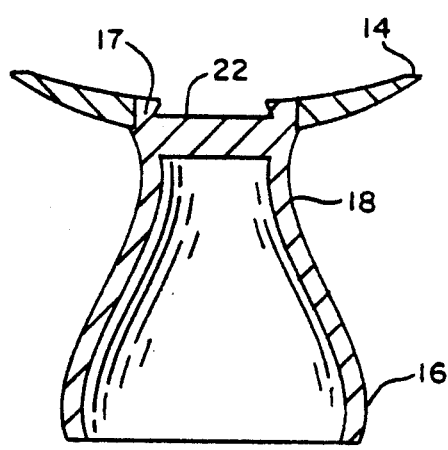
FIG. 2B is a partial sectional side elevation of an alternate embodiment.

Referring particularly to FIG. 2A, a side elevation (sectional) illustration, the reader may clearly discern that the confection 12 rests atop the drip catch 14 within its planar platform 15. Undisclosed to this point is the annular groove, depression or well 22 which secures a portion of the solidified confection 12. It is also seen, from this illustration, that the handle 16 is distinct and separable from the drip catch 14, which may clearly be discerned at the juncture of the handle and the drip catch, slightly above the neck 18 of the handle. Means for accomplishing this weld (juncture) are left to the producer of the device. Since the separate drip catch may be consumable, it is formed from an edible carbohydrate; while the handle, in order to be biodegradable, is composed of almost any carbohydrate. The bonding or welding substance, therefore, need only be a carbohydrate, preferably edible mucilage such as a corn starch and sucrose paste. FIG. 2B discloses an alternate embodiment which, in cross section, shows the annular drip catch 14 to be a true annulus as it contains a central hole which allows it to be fitted over the neck protrusion 17 or "nub" of the handle 16. The reader should take note of the fact that here, in this alternate embodiment, the well 22 is a part of the handle proper (in the "nub") and the drip catch 14 is placed over the protrusion 17 after both are fabricated, presumably of different materials. Such an embodiment is more costly, however, in that a drip catch formed as an annulus is placed over the neck 18 protrusion 17 and, then, the confection 12 is secured thereon. In the preferred embodiment, the handle/drip catch 14 is produced integrally and the confection is immediately thereafter placed on the drip catch platform 15 completing all of the components of the invention combination. Finally, and relative to the confection 12, the reader's attention is called to FIG. 2C which discloses, in isometric, a nipple of the type commonly affixed to baby feeding bottles. This is the general configuration of the confection 12, the base portion 20' being analogous to the confection base 20 and the nipple 24' being analogous to the tip portion 24 of the confection disclosed herein.

Figure 3:
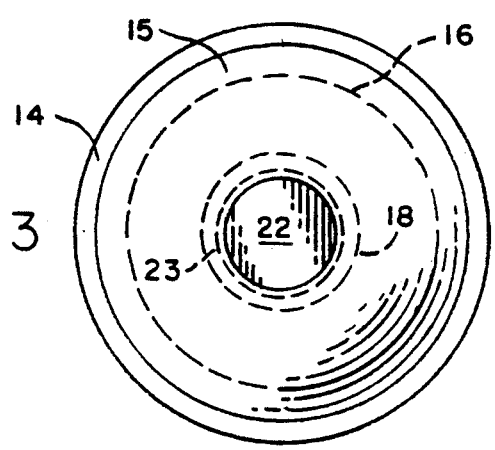
FIG. 3 is a top plan view of the confection holder device.

Final to this disclosure is the top plan view of the invention as presented in FIG. 3. Again, for the sake of clarity, the confection 12 has been omitted and the viewer looks down directly on the collar or drip catch 14 ensemble. In concentric array, there is illustrated the drip catch 14; and, moving radially inward, there is illustrated (in phantom) handle 16 periphery, neck 18 periphery, well outer diameter 23 (invisible), and confection mounting well 22. The platform 15 portion is also clearly visible.

I have thoroughly described my invention, as well as the advantages it holds for the industry and the disadvantages in the prior art that it clearly avoids. Many other forms of confection, such as candy and the like, would adapt very well to this form of mounting. Other elements such as means for causing the adherence of the confection to the drip catch or apron will now appear intuitive to those of ordinary skill and I would encourage use of the invention to the fullest extent possible consistent with the appended claims.

What is claimed is:

1. The combination of a solid confection and a holder therefore, said holder comprising a handle means and a drip catch means, said handle means comprising a handle of diminutive size sufficient to fit and rest essentially in the open, cupped palm of a small child's hand, said handle having a generally skirt-like shape that diminishes from a wider, flattened base upwards to a narrower neck having a circumferential dimension that may be encircled by said child's opposing thumbs and index finger, said base being flat and flared and having a diameter greater than that of said neck, said drip catch means comprising either a continuous platform for said solid confection positioned on top of said neck of said handle or an annular collar containing a central hole with said annular collar being secured to and around the upper portion of the neck of said handle with said upper portion of the neck of said handle being fitted in said hole of said annular collar, said drip catch means comprising either said continuous platform or said annular collar both having upturned perimetral borders to retain any drippings from said confection, said holder further comprising means to secure said confection to said holder, said means to secure comprising a groove located either in and below the upper surface of said continuous platform when said platform is positioned on top of said neck or in and below the upper surface of said neck itself when said annular collar is secured around the top portion of said neck, said groove being centrally positioned relative to said drip catch means and having an undercut cross-sectional configuration, said solid confection being supported on either said continuous platform or the combination of said annular collar and said neck secured thereto, with a portion of said solid confection filling said grooves, said grooves being dimensioned and configured to anchor said confection on said holder without the use of stick-like supports projecting therefrom.

2. The invention of claim 1 wherein said drip catch means is edible and said handle means is bio-degradable, non-toxic and inedible.

3. The invention of claim 1 wherein said confection mass comprises a safety morphology defined by a flared base portion which necks to a nipple-shaped tip, whereby a small child is restrained from inserting but a small portion of said mass into it's mouth.

4. The invention of claim 1 wherein said solid confection is ice cream.

* * * * *